US012620510B2

(12) United States Patent
Soneja et al.

(10) Patent No.: US 12,620,510 B2
(45) Date of Patent: May 5, 2026

(54) METHOD OF PRODUCING A SURFACE FINISH ON AN ELECTRICALLY CONDUCTIVE SUBSTRATE AND ELECTRIC CONDUCTOR WITH THE SURFACE FINISH THEREON

(71) Applicants: TE Connectivity Germany GmbH, Bensheim (DE); TE Connectivity Solutions GmbH, Schaffhausen (CH)

(72) Inventors: Shallu Soneja, Fremont, CA (US); Yiliang Wu, Fremont, CA (US); Gokce Gulsoy, Fremont, CA (US); Helge Schmidt, Speyer (DE); Soenke Sachs, Bensheim (DE)

(73) Assignees: TE Connectivity Germany GmbH, Bensheim (DE); TE Connectivity Solutions GmbH, Schaffhausen (CH)

( * ) Notice: Subject to any disclaimer, the term of this patent is extended or adjusted under 35 U.S.C. 154(b) by 295 days.

(21) Appl. No.: 18/340,391

(22) Filed: Jun. 23, 2023

(65) Prior Publication Data

US 2023/0420164 A1 Dec. 28, 2023

(30) Foreign Application Priority Data

Jun. 24, 2022 (EP) .................................... 22181010

(51) Int. Cl.
*H01B 13/32* (2006.01)
*H01B 1/02* (2006.01)
(Continued)

(52) U.S. Cl.
CPC ............ *H01B 13/322* (2013.01); *H01B 1/02* (2013.01); *H01B 5/02* (2013.01); *H01B 13/0016* (2013.01); *H01B 13/003* (2013.01)

(58) Field of Classification Search
CPC ...... H05K 3/1275; H01B 13/322; H01B 1/02; H01B 5/02; H01B 13/0016; H01B 13/003
See application file for complete search history.

(56) References Cited

U.S. PATENT DOCUMENTS 5,415,944 A 5/1995 Kazem-Goudarzi et al.
10,470,314 B1 11/2019 Stoltenberg et al.
(Continued)

FOREIGN PATENT DOCUMENTS

JP 2004011014 A 1/2004
JP 2014516384 A 7/2014
(Continued)

OTHER PUBLICATIONS

Machine translation of KR-20140108770-A (Year: 2014).*
(Continued)

*Primary Examiner* — Jeremy C Norris
(74) *Attorney, Agent, or Firm* — Barley Snyder

(57) ABSTRACT

A method for producing a surface finish on an electrically conductive substrate includes transferring an ink having a plurality of electrically conductive particles onto an area of a predetermined form and/or size on a surface of the electrically conductive substrate by gravure and/or flexo printing. The ink is heated to a temperature that is higher than a melting point of the electrically conductive particles to create a melt. The melt solidifies into the surface finish on the electrically conductive substrate.

19 Claims, 3 Drawing Sheets

(51) Int. Cl.
*H01B 5/02* (2006.01)
*H01B 13/00* (2006.01)

(56) References Cited

U.S. PATENT DOCUMENTS

| | | | | |
|---|---|---|---|---|
| 2003/0084796 | A1* | 5/2003 | Kwon | B41M 1/10 101/41 |
| 2009/0191356 | A1 | 7/2009 | Lee et al. | |
| 2009/0310320 | A1 | 12/2009 | Roth et al. | |
| 2018/0261563 | A1 | 9/2018 | Chen | |
| 2020/0010707 | A1 | 1/2020 | Sylvie et al. | |
| 2020/0245465 | A1 | 7/2020 | Zhang et al. | |

FOREIGN PATENT DOCUMENTS

| | | | | |
|---|---|---|---|---|
| KR | 1020100133368 | A | 12/2010 | |
| KR | 20140108770 | A * | 9/2014 | H05K 1/11 |
| WO | 2012136614 | A2 | 10/2012 | |
| WO | 2013113995 | A1 | 8/2013 | |

OTHER PUBLICATIONS

Indian Examination Report dated Apr. 3, 2024, corresponding to Application No. 202344041749, 6 pages.
Japanese Office Action dated Oct. 8, 2024 with English translation, corresponding to Application No. 2023-101299, 13 pages.
Korean Office Action dated Mar. 20, 2025 with English translation, corresponding to Application No. 10-2023-0080741, 19 pages.

* cited by examiner

METHOD OF PRODUCING A SURFACE FINISH ON AN ELECTRICALLY CONDUCTIVE SUBSTRATE AND ELECTRIC CONDUCTOR WITH THE SURFACE FINISH THEREON

CROSS-REFERENCE TO RELATED APPLICATION

This application claims the benefit of the filing date under 35 U.S.C. § 119(a)-(d) of European Patent Application No. 22181010.4, filed on Jun. 24, 2022.

FIELD OF THE INVENTION

The present invention relates to a method of producing a surface finish on an electrically conductive substrate. Furthermore, the invention relates to an electric conductor comprising an electrically conductive substrate with a surface finish thereon.

BACKGROUND

Electric conductors are used in a variety of applications to form electric connections with mating conductors. The electric conductors, such as electric contacts, comprise an electrically conductive substrate, such as copper or a copper alloy, for transferring the electricity. To facilitate the connection movement of electric contacts and prevent surface damage due to oxidation and other causes, electric contacts are provided with a surface finish. Traditionally, surface finishes are applied onto the electrically conductive substrate using electroplating, electroless plating, physical vapor deposition, or hot dipping. These processes are expensive and/or a surface finish based on tin tends to form whiskers.

SUMMARY

A method for producing a surface finish on an electrically conductive substrate includes transferring an ink having a plurality of electrically conductive particles onto an area of a predetermined form and/or size on a surface of the electrically conductive substrate by gravure and/or flexo printing. The ink is heated to a temperature that is higher than a melting point of the electrically conductive particles to create a melt. The melt solidifies into the surface finish on the electrically conductive substrate.

BRIEF DESCRIPTION OF THE DRAWINGS

Exemplary embodiments of the invention are described by way of the following drawings. In the drawings.

DETAILED DESCRIPTION OF THE EMBODIMENT(S)

Figure 1:
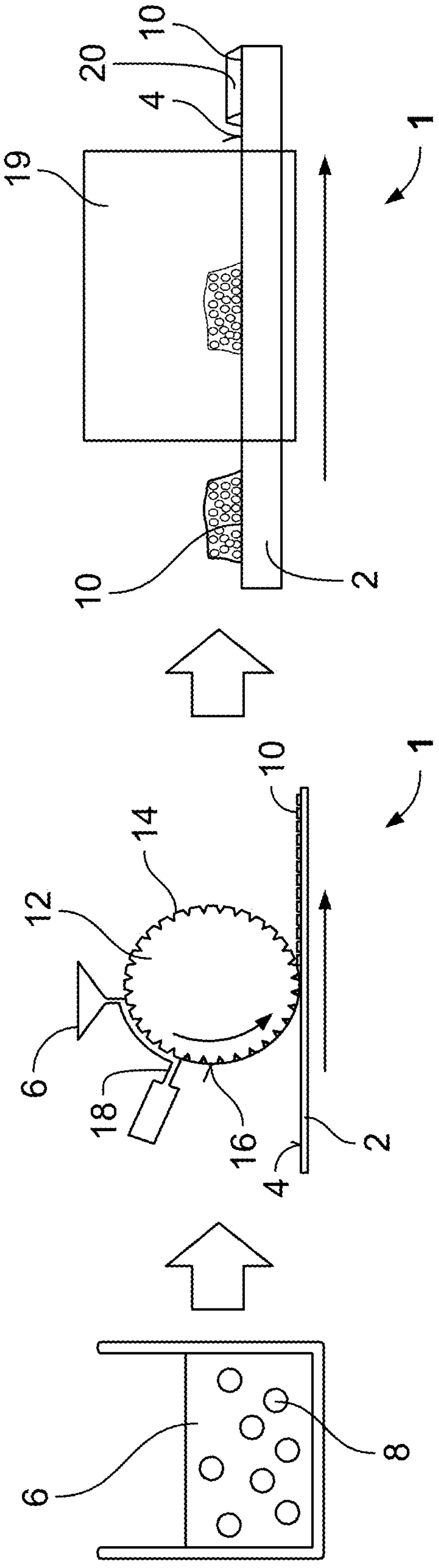
FIG. 1 shows a schematic flow chart for producing a surface finish on an electrically conductive substrate according to an exemplary embodiment of the invention.

In the following, exemplary embodiments of a method of producing a surface finish and electric conductor are explained in greater detail with reference to the accompanying drawings. In the figures, the same reference numerals are used for elements that correspond to one another in terms of their function and/or structure.

According to the description of the various aspects and embodiments, elements shown in the drawings can be omitted if the technical effects of these elements are not required for a particular application, and vice versa, i.e. elements that are not shown or described with reference to the figures, but are otherwise described herein, can be added if the technical effect of those particular elements is advantageous in a specific application.

FIG. 1 is a schematic flow chart of a method for producing a surface finish on an electrically conductive substrate. According to the exemplary embodiment, an electrically conductive substrate 2, which may comprise or consist of copper or a copper alloy, has a surface 4. An ink 6 with electrically conductive particles 8, in particular tin or tin alloy particles, is transferred onto an area 10 of predetermined form and/or size on the surface 4 via gravure printing in the exemplary embodiment shown. Alternatively, the ink 6 with the electrically conductive particles 8 could be transferred via flexo printing instead of gravure printing, or the ink 6 could be transferred using a combination of gravure printing and flexo printing.

In an embodiment, the electrically conductive particles 8 in the ink 6 may comprise or consist of tin. The term "tin" pertains to pure tin and/or tin alloys, such as SAC, which is a tin silver copper alloy. The tin alloy may for example have a tin content of about 96.5 wt %, a silver content of about 3.5 wt % and a copper content of about 0.5 wt %. A tin surface finish protects the substrate from corrosion and is highly reliable for establishing electric interconnections between the conductors and mating conductors at a low cost. Using the above method for tin finishes is particularly advantageous as cost savings of up to 65% compared to the cost of a hot dipped Sn finish can be achieved.

The gravure printing process uses a cylinder 12 having engraved cells 14 on its surface 16. These cells 14 are flooded with ink 6, wherein any excess can be removed with a doctor blade 18. These engravings can have patterns which may be square, rectangle, oval, circle, stripes etc. which helps with material savings and can be custom designed to the product.

The ink 6 from the cells 14 is then transferred to the substrate 2 by capillary action. Gravure printing has significant advantages over other printing processes when it comes to transferring the ink 6 to the substrate 2. Gravure printing excels with speed, laying down variable ink film thickness, long press runs and the simplicity of the process involved in transferring the ink 6 onto the substrate 2. Furthermore, large areas of ink 6 can be transferred at high speeds with nominal distortion. Consequently, gravure printing offers a cost effective solution in comparison to the conventional methods for producing a surface finish onto an electrically conductive substrate.

In flexographic printing (also referred to as flexo printing), an artwork is designed based on the desired final print on an anilox roll similar to gravure printing. Instead of the anilox roll directly transferring the ink to the substrate as is the case with gravure printing, the anilox roll for flexographic printing transfers the ink to an image carrier which, in turn, transfers the image to the substrate. The flexographic press pulls the substrate between the image carrier and image cylinder. The rolling design of flexographic printing helps achieve high speeds and enables large print runs similar to gravure printing.

Gravure printing is particularly advantageous in comparison to other known printing processes, such as screen printing and ink jet. For example, the resolution in screen printing is limited due to the mesh screen the ink paste is pressed through. The resolution for ink jet is too low for application in electronic systems. Furthermore, screen printing cannot offer a thin layer of less than 5 microns. These processes also lack the speed of gravure printing. Further, the material to be used in inkjet printing is not economical. Due to the small nozzle orifice of inkjet printhead, small particles (e.g. less than 1 micron) have to be used to formulate the ink, typically nanoparticle ink, which is quite expensive. The same advantage applies to an embodiment in which the ink 6 is transferred via flexo printing.

After the ink 6 has been transferred to the surface 4, the electrically conductive substrate 2 is moved into an induction apparatus 19, e.g an inductive oven. In the apparatus 19, the ink 6 is heated up via induction heating to a temperature that is higher than a characteristic melting point of the electrically conductive particles 8. In comparison to other heating methods, such as IR heating, hot air heating or reflow heating under N2, the integrity of the surface finish when heated via induction heating is far superior. Induction heating is particularly advantageous, as the substrate 2 is electrically conductive. This means that eddy currents may form in the substrate leading to heating the ink 6 from below. The eddy currents flow against the electrical resistivity of the electrically conductive particles and/or electrically conductive substrate, e.g. a Cu substrate, generating precise and localized heat within the substrate, and in turn indirectly heat and melt the conductive particles in the ink. Heating not only the ink, but also the substrate further improves bonding of the finish to the substrate, for example by forming intermetallics during the heating process.

The heating is dependent on the coil geometry, heating time and current. For example, satisfactory reflow results may be achieved by heating for about 15 s or about 20 s at about 5 A with a pancake coil. It is understood that the heating time may be reduced if a higher current is used. Furthermore, the heating time and current can be further adjusted depending on the coil geometry, as the coil geometry determines how efficiently the substrate is heated.

The ink starts melting from the bottom up towards the top. By adjusting the time exposure and current of the induction heater, the properties of the melt and/or surface finish can be varied which increases the versatility of surface finishes produced by the method. The dwell times for this process can range anywhere from 0.5 seconds to 5 seconds and is dependent on the coil geometry as well. In some embodiment, a constant current is applied to the induction heating coil for heating the conductive ink. In other embodiment, stepwise currents are applied to the induction heating coil, for example a high-low-high current profile, or a high-low-low profile. In further embodiment, a pulse current is applied to induction heating coil, for example a 5-second pulse with a 5-second interval for a total of 4 pulses, or a 3-second pulse with a 5-second interval for a total of 5 pulses. Combination of different currents, pulse length, and interval will ensure a more uniform temperature profile, and avoid overheating the substrate. In some instances, the distance between the coil and the substrate as well as the rate at which substrate travels between the coils can improve and influence the uniformity of the finish. The substrate could be directly on the coil, i.e. at a distance of 0 mm, or at a distance of up to 15 mm. In one embodiment, the distance between substrate and coil can be 0 mm to 15 mm. The travel rate can be 1 m/min to 60 m/min.

After melting the electrically conductive particles 8, components of the ink 6 may evaporate or form a mixture with the melt. The melt subsequently solidifies into a surface finish 20. Thus, the ink 6 is reflowed and adhered to the substrate 2. Consequently, the integrity of the surface finish is ensured preventing removal of the surface finish from the substrate for example by wiping. Furthermore, whisker formation can be mitigated by reflowing the ink 6.

Simultaneously to applying the ink 6 with the electrically conductive particles 8 comprising or consisting of tin, a second ink with a second set of electrically conductive particles of a different material may optionally be transferred to a second area of predetermined size and/or form. Transferring simultaneously shortens the entire production time.

The second set of electrically conductive particles may particularly comprise or consist of silver. It is understood that silver may mean pure silver or a silver alloy. Silver is particularly suitable for high frequency applications having an excellent electrical conductivity. Thus, the second area may particularly be arranged at a contact area for releasable electric connections such as plug connections or the like. The first area may be arranged at an attachment area, such as a crimp area of the electric conductor 1. Such attachment areas are often plastically deformed in order to be fixed to a mating conductor and form an electric connection with the mating conductor.

The first area and the second area may be different and not overlapping. During the induction heating, the particles comprising and/or consisting of silver may be heated up but are not melted. However, the induction heating process may provide advantages to the second area, for example reducing the processing time for the second ink, and improving the adhesion of the ink to the substrate, thus, reducing ablation of the second ink during the subsequent melting process. In an embodiment, the second set of electrically conductive particles is melted in a subsequent processing step after melting the first set of electrically conductive particles via induction heating.

The second set of electrically conductive particles may be melted for example via electron beam melting. During electron beam melting, the substrate with the ink is placed under a vacuum and fused together through heating by an electron beam. As the electrically conductive particles comprising or consisting of tin have already been reflowed, only the second set of electrically conductive particles, i.e. the silver particles, needs to be melted via an electron beam.

An electron beam has very high kinetic energy, which is converted to heat and melts the metal particles in the second ink. Since only the silver particles are melted with electron beam melting, the thermal stresses, which could result in a deformation of the substrate, can be mitigated. Furthermore, electron beam melting is subject to high material loss due to ablation and/or evaporation. In particular, melting of the tin via electron beam can be avoided. Tin has a much lower melting point than silver and has a high vapour pressure, which results in explosive evaporation when heated with an electron gun. This would contaminate the vacuum chamber and results in frequent degradation of the vacuum.

When the electrically conductive particles 8 in the ink 6 comprise or consist of tin, the ink 6, particularly the electrically conductive particles 8, is not melted via electron beam melting. Tin has a high vapour pressure, which results in explosive evaporation when heated with an electron gun. This contaminates the vacuum chamber and results in frequent degradation of the vacuum.

The tin for example may be melted in a first step via induction heating, which may also serve as a drying step for the second ink. The first step via induction heating may also help to improve the adhesion of the second ink, reducing ablation of the second ink during the subsequent e-beam step of the second ink. The surface area of the first area may be larger than the second area. In particular, the surface area of the first area may be at least double the surface area of the second area.

The quality of the tin surface finish 20 is dependent on the ink 6 formulation and the processing conditions. Thus, the surface finish 20 may be adjusted by modifying the ink. In particular, the ink 6 may be optimized for viscosity and rheology allowing an optimal print quality and a homogeneous print thickness. It has been found that printing with solder pastes, which have a dynamic viscosity of more than 10 Pa s measured at 10 $s^{-1}$ at 25° C., does not provide satisfactory results. The dynamic viscosity of the ink may be below 10 Pa s measured at 10 $s^{-1}$ at 25° C., in particular below 1 Pa s measured at 10 $s^{-1}$ at 25° C.

Another component of the ink 6, which ensures a good wettability, is the oxidation level of the tin particles 8 in the ink 6. Commonly available tin powders have surface oxide. The melting point of tin oxide is substantially higher (1630° C.) than pure tin (232° C.) and will not melt with conventional methods. These surface oxides have thus negative effects on the reflow and wetting properties. Advantageously, the tin particles 8 may comprise an oxygen content of not more than about 1 wt %, not more than about 0.8 wt %, less than about 0.5 wt %, less than about 0.3 wt %, less than about 0.2 wt % or even less than about 0.1 wt %. Consequently, the wetting ability of the ink 6 can be further improved.

Yet another component of the ink 6 can be an organic binder or stabilizer. It is used to disperse the metal particles and to adjust ink viscosity. The binder or stabilizer materials may be degraded during the induction heating step. In some embodiments, the binder and stabilizer materials remain or partially remain, or the decomposed component of the binder and stabilizer materials remains after the induction heating step. Without limiting to any theory, it is believed that these binder and stabilizer or their decomposed component will prevent the formation of whiskers.

The ink 6 may comprise multiple components, in particular a binder, dispersant, solvents and the electrically conductive particles 8. By "melting the ink" it is understood that at least a portion of the electrically conductive particles 8 is melted. Thus, the method may comprise the step of heating the ink 6 to a temperature to melt all particles 8, or the method may comprise the step of heating the ink 6 to a temperature higher than a characteristic melting point of the electrically conductive particles 8. Other components of the ink 6 may have been evaporated already at this melting point.

With gravure printing and/or flexo printing, it is possible to achieve a dense and thin surface finish. The surface finish may have for example a thickness of less than ten times, five times or two times the average diameter of the electrically conductive particles 8 in the ink 6. Some applications require a thickness of the surface finish 20 of about 2 to about 10, or even to about 5 μm. For achieving a satisfactory homogenous surface finish with such a small thickness, it has been found that a particle size of the electrically conductive particles 8 comprising or consisting of tin of less than about 25 μm, or less than about 10 μm, in particular less than about 5 μm. In an embodiment, the average particle size is between 2 μm to about 10 or about 5 μm. In an embodiment, the surface finish may have a thickness of between about 2 μm to about 10 or to about 5 μm.

With gravure printing and flexo printing and a combination of both, high resolutions can be achieved. Hence, the electric conductor 1 may comprise a surface finish having a particularly high resolution. For example, a lateral resolution at an edge of the surface finish may be less than about 1 mm, particularly less than about 0.2 mm. The lateral resolution is defined as the minimum distance at which two points can be distinguished as individuals. Thus, the lateral resolution being small allows to discern two separate objects, i.e. the surface finish and the surface of the substrate, which are adjacent to one another.

With decreasing size of the electrically conductive particles 8, the total surface area increases, which corresponds to higher oxide content. Thus, low oxide content tin or tin alloy powders are more commonly available in large particle size having an average diameter of more than 25 μm. For improving the quality of the surface finish, it is desired to provide an ink 6 with electrically conductive particles 8 having an average diameter of less than 10 μm and a low oxygen content, in particular less than about 0.1 wt %.

In an embodiment, the particle size distribution of the electrically conductive particles 8 used in the ink 6 is narrow. By adjusting the particle size distribution to a narrow spectrum, it is possible to get a more uniform print with less streaks.

Figure 3:
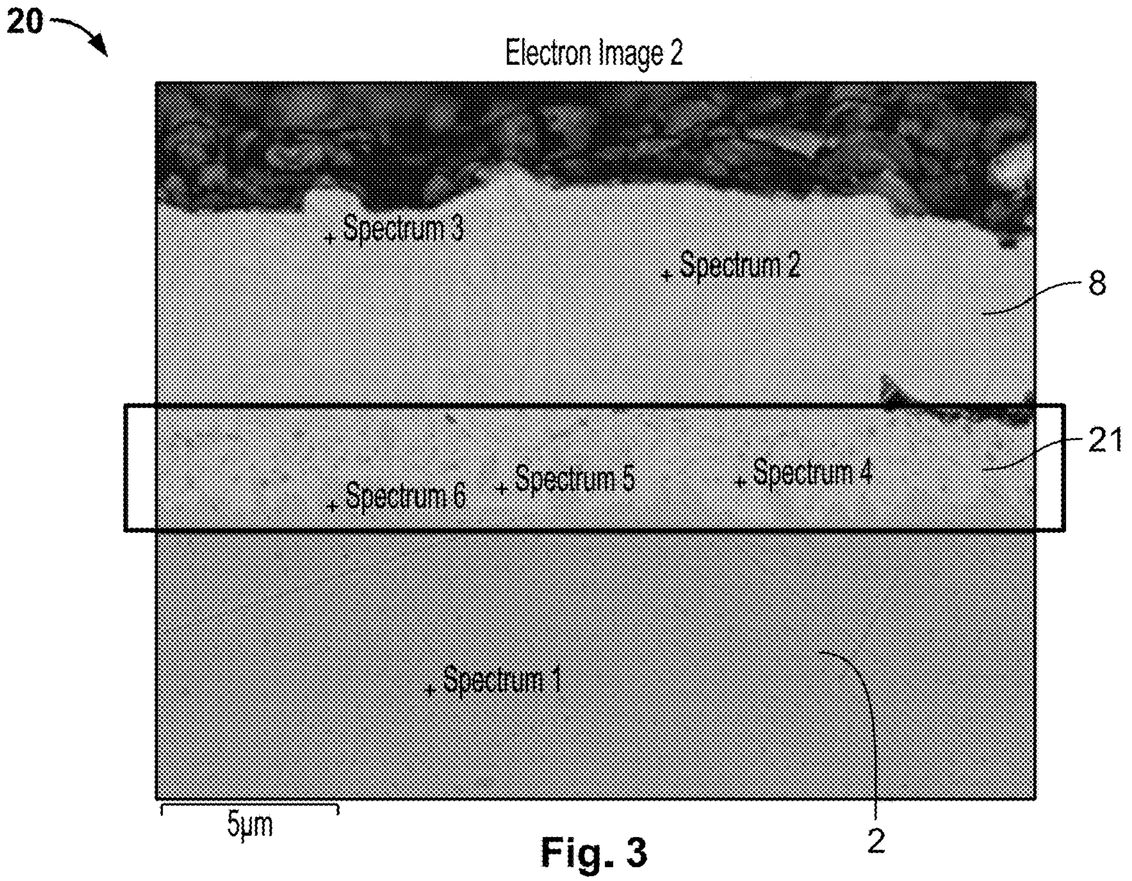
FIG. 3 a cross-section scanning electron microscope (SEM) image of the surface finish showing an intermetallic layer and free Sn layer.

Different techniques were evaluated to melt the printed ink, such as reflow under nitrogen, hot air, IR heating and induction heating. The integrity of the finish was determined by testing the adhesion of the ink 6 to the substrate 2 using a scotch tape and cleaning with isopropylalcohol (IPA). A well adhered ink 6 will not wipe off when treated with IPA or scotch tape. The best results were achieved when the prints were heated with an induction heater. In one sample, a tin silver copper alloy (SAC) ink is printed on a copper alloy as an electrically conductive substrate. The copper alloy may be phosphor bronze. The ink was heated at 5 A for 20 seconds by an induction heater. The resulting surface finish had a thickness of 2.29 μm as measured by an XRF. An XRD analysis of this sample showed multiple phases including Cu, $SnO_2$ and also intermetallic peaks of $Cu_6Sn_5$ at the interface of the electrically conductive substrate 2 and the tin surface finish 20, which is indicative of a strong joint. FIG. 3 shows a cross-section scanning electron microscope (SEM) image of the surface finish 20 showing the electrically conductive substrate 2, the intermetallic layer 21 and a layer of solid electrically conductive particles 8 forming a top layer of the surface finish 20. The surface finish produced by the above method has a distinct topography with a particle like structure. The intermetallic phase is indicative of a strong joint between the electrically conductive substrate and the surface finish.

In an embodiment, the intermetallic phase is formed at an interface of the electrically conductive substrate. The layer of solid electrically conductive particles forms a top layer of the surface finish. The top layer is defined as the layer facing away from the surface of the electrically conductive substrate at the area. The solid electrically conductive particles forming a top layer of the surface finish may increase the friction coefficient. This is particularly advantageous for crimping applications as slippage may be prevented. In the solidified surface finish, the less than 50%, for example 20-40% of the ink 6 can be formed into the intermetallic phase. The rest of the ink 6 can form the layer of solid electrically conductive particles 8.

Figure 4:
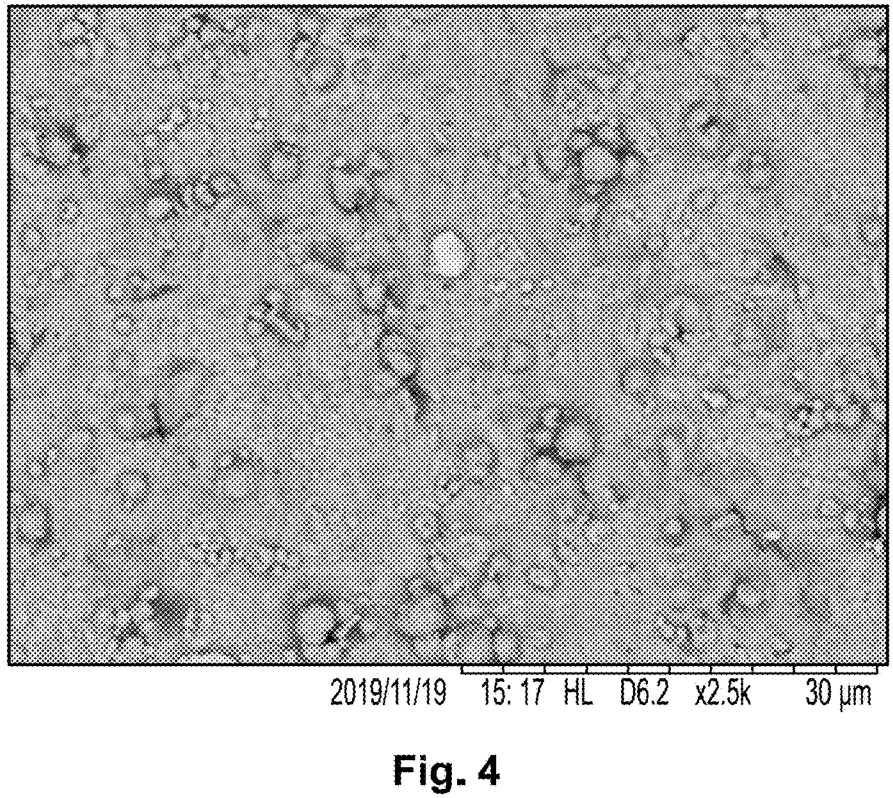
FIG. 4 a top view SEM image showing the particulate structure.

FIG. 4 is a top view SEM image that shows a particulate structure formed on the top surface of the surface finish 20 resulting from the method of the present invention. Hot-dipped tin and ebeamed tin surface finishes have a rather smooth top surface. These particulate structures formed provides a further unique feature of the present invention that provides the surface finish 10 with a surface roughness. This is particularly useful for crimped termination. Particulate surface imparts surface roughness to the product and is indicative of some amount of free Sn and some intermetallics. Intermetallics are brittle, whereas free Sn is soft. Having a unique particulate surface with surface asperities and/or surface roughness leads to a higher amount of plastic deformation during contacting. It leads to a larger contact area as well. Such particulate surface thus reduces lower contact resistances and also reduces friction coefficients. The surface roughness further causes changes in the mechanical properties of the surface and helps prevent the propagation of microcracks on the surface.

In order to examine the wear friction and contact resistance, further tests were performed. Caps were punched out of coupons printed and induction heated for 20 seconds and tested against the same flats examining the coefficient of friction. The coefficient of friction between the cap and the contact finishes was measured under 200 g load for up to 100 cycles of forward and backward strokes over a 5 mm wear track. The results have shown that a reflowed SAC ink on phosphor bronze exhibits a stable wear/friction response. The coefficient of friction stabilized at around 0.5 or 0.7, which is lower than the coefficient of friction of an electroplated tin finish over a nickel plated phosphor bronze, which ranges from more than 0.7 to about 0.9.

The reflowed SAC finish was further benchmarked against a hot dipped tin finish. In the hot dipped Sn finish, almost fully intermetallic converted thermic tin exhibited very low friction coefficients of between 0.15 to 0.3. This further indicates that the gravure printed and reflowed SAC was not fully converted into copper tin based intermetallics. Rather, the surface finish 20 exhibits free tin particles. This is particularly advantageous if the surface finish 20 is applied to a crimping area of an electric conductor 1.

Contact resistance performance measurements were carried out using a 2.5 μm thick electroplated gold on AgNi probe with a radius of 1.5 mm. The contact resistance was measured at each incremental load in the range of 0 to 5 N. The reflowed SAC finish was compared to hot dipped tin and bare copper. The contact resistance of bare copper was much higher compared to that of the tin finishes, as high normal forces were required to disrupt the surface films on copper. The static contact resistance of the reflowed SAC finish is similar to the hot dipped tin resistance.

All in all, the test results have shown that with gravure printing and reflowing, a surface finish 20 has been produced, which is comparable to hot dipped surface finishes. Gravure printing and reflowing is more cost efficient and versatile allowing for a wide variety of different surface finishes and/or patterns.

Figure 2:
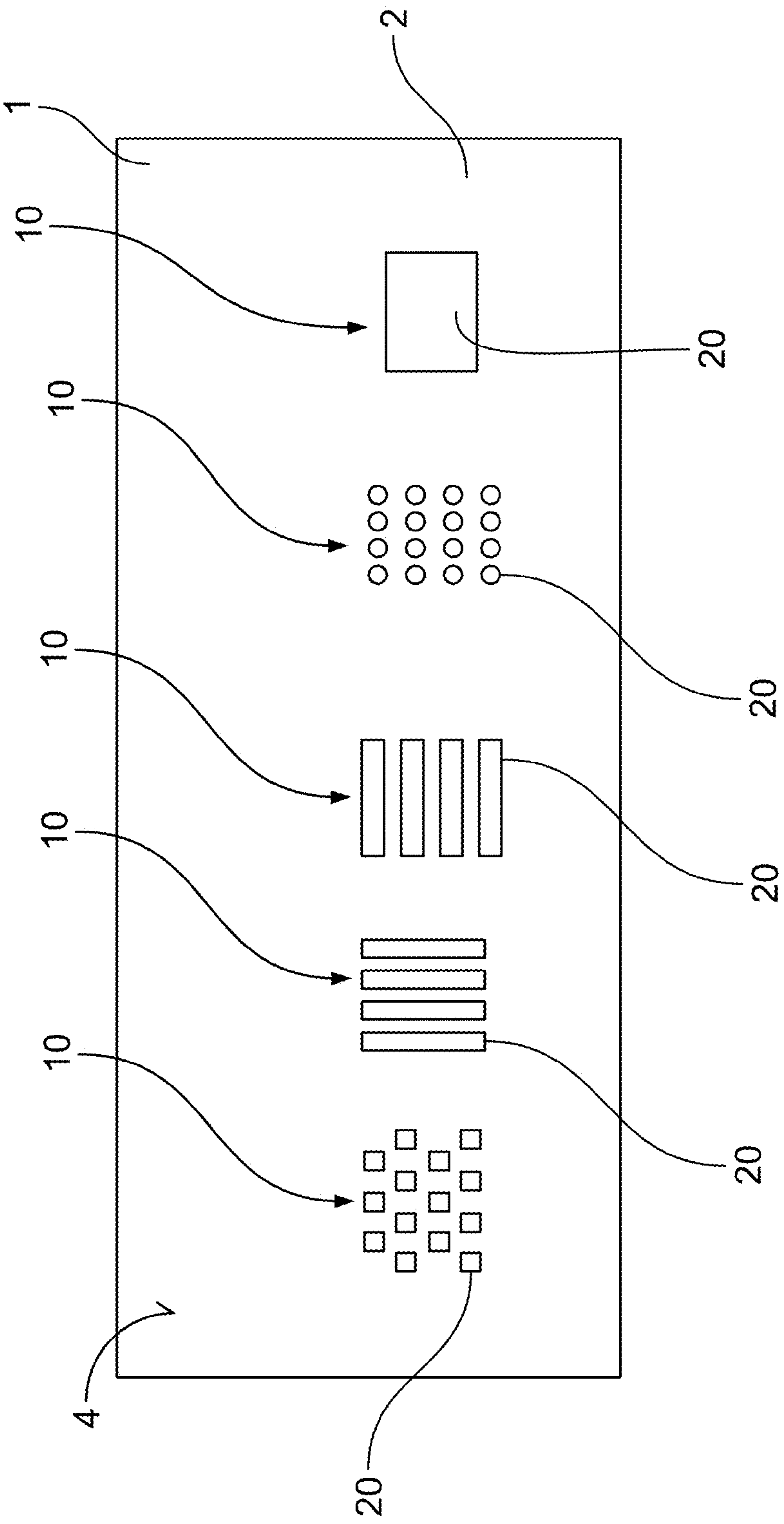
FIG. 2 shows a top view of an electric conductor having a surface finish, according to an exemplary embodiment of the invention.

In FIG. 2, an exemplary embodiment of an electric conductor 1 is shown in a top down view. The electric conductor 1 comprises an electrically conductive substrate 2 having at least one area 10 of predetermined size and/or form, on which a surface finish 20 has been applied by gravure printing and reflowing by melting the printed ink 6, which in turn solidifies into the surface finish 20.

The electric conductor 1 can be for example a crimp terminal having a crimping area for attaching the terminal to a mating conductor. In this case, a surface finish may be applied onto the crimping area.

In some embodiments, the substrate 2 hardness (Hardness measurements were done using Micro Vickers Hardness Tester) is retained after the induction heating. For example, the substrate 2 hardness is about at least 90%, including at least 95% of the original hardness. In other embodiments, the substrate 2 hardness is modified after the induction heating. For example, the substrate 2 hardness is reduced to no more than about 40% or 50% or 80% of the original hardness. Retained or modified hardness can be achieved with different dwell times, temperatures, and temperature profiles, for different applications. As can be seen, a variety of different patterns can be printed with the gravure printing, with a flexo printing process, or with a combination of gravure and flexo printing, all of which are reliable and have a high resolution at the edges. Different surface finishes 20 can be formed at different areas. In an embodiment, a tin surface finish is formed on a first area and a silver surface finish on a second area.

Furthermore, the above method is versatile and can be used to customize the surface finish according to the application requirements with high accuracy. Thus, the surface finish may have a predetermined variation of thickness within the area and a particular surface structure and/or pattern.

What is claimed is:

1. An electric conductor, comprising:
an electrically conductive substrate having a surface with an area of predetermined size and/or form on which a surface finish is applied, the surface finish is produced by:
transferring an ink having a plurality of electrically conductive particles onto the area by gravure and/or flexo printing; and
heating the ink to a temperature that is higher than a melting point of the electrically conductive particles to create a melt, which solidifies into the surface finish on the electrically conductive substrate, a layered structure is formed in the area that has an intermetallic phase and a layer of solid electrically conductive particles.

2. The electric conductor of claim 1, wherein the layer of solid electrically conductive particles forms a top layer of the surface finish.

3. The electric conductor of claim 1, wherein a plurality of edges of the surface finish have a lateral resolution of less than 1 mm.

4. The electric conductor of claim 1, wherein the surface finish has a predetermined variation of thickness within the area.

5. The electric conductor of claim 1, wherein the surface finish has a thickness from about 0.75 to about 5 micrometers.

6. The electric conductor of claim 1, wherein the surface finish has an organic material from about 0.01 to about 0.5 wt % organic material.

7. The electric conductor of claim 1, wherein the surface finish has a particulate structure on the surface.

8. An electric conductor, comprising:
an electrically conductive substrate having a surface with an area of predetermined size and/or form on which a surface finish is applied, a plurality of edges of the surface finish have a lateral resolution of less than 1 mm, the surface finish is produced by:
transferring an ink having a plurality of electrically conductive particles onto the area by gravure and/or flexo printing; and
heating the ink to a temperature that is higher than a melting point of the electrically conductive particles to create a melt, which solidifies into the surface finish on the electrically conductive substrate.

9. An electric conductor, comprising:

an electrically conductive substrate having a surface with an area of predetermined size and/or form on which a surface finish is applied, the surface finish has an organic material from about 0.01 to about 0.5 wt % organic material, the surface finish is produced by:

transferring an ink having a plurality of electrically conductive particles onto the area by gravure and/or flexo printing; and heating the ink to a temperature that is higher than a melting point of the electrically conductive particles to create a melt, which solidifies into the surface finish on the electrically conductive substrate.

10. An electric conductor, comprising:

an electrically conductive substrate having a surface with an area of predetermined size and/or form on which a surface finish is applied, the surface finish has a particulate structure on the surface, the surface finish is produced by:

transferring an ink having a plurality of electrically conductive particles onto the area by gravure and/or flexo printing; and heating the ink to a temperature that is higher than a melting point of the electrically conductive particles to create a melt, which solidifies into the surface finish on the electrically conductive substrate.

11. A method for producing a surface finish on an electrically conductive substrate, comprising:

transferring an ink having a plurality of electrically conductive particles onto an area of a predetermined form and/or size on a surface of the electrically conductive substrate by gravure and/or flexo printing, the ink is a first ink having a first set of electrically conductive particles and is transferred to a first area of predetermined form and/or size by gravure and/or flexo printing, and a second ink having a second set of electrically conductive particles is transferred to a second area of predetermined form and/or size, a material of the first set of electrically conductive particles is different than a material of the second set of electrically conductive particles; and heating the first ink and the second ink to a temperature that is higher than a melting point of the first set and the second set of electrically conductive particles to create a melt, which solidifies into the surface finish on the electrically conductive substrate.

12. The method of claim 11, wherein the first ink and the second ink are heated by induction heating the electrically conductive substrate.

13. The method of claim 11, wherein the first set of electrically conductive particles comprise tin.

14. The method of claim 11, wherein the first ink and the second ink are melted in subsequent steps.

15. The method of claim 14, wherein the first ink is melted via induction heating.

16. The method of claim 15, wherein the second ink is melted via electron beam melting.

17. The method of claim 11, wherein the first set of electrically conductive particles has an average particle size of about 2 μm to about 5 μm.

18. The method of claim 11, wherein the first ink has a dynamic viscosity below 10 Pa s, measured at 10 $s^{-1}$ at 25° C.

19. The method of claim 11, wherein the first set of electrically conductive particles has an oxygen content of less than 1 wt %.

* * * * *